(12) United States Patent
Benari et al.

(10) Patent No.: US 11,204,854 B2
(45) Date of Patent: *Dec. 21, 2021

(54) SYSTEMS AND METHODS FOR DETERMINING USER ENGAGEMENT WITH ELECTRONIC DEVICES

(71) Applicant: Verizon Media Inc., New York, NY (US)

(72) Inventors: Osnat Benari, New York, NY (US); Ruiheng Wang, Jersey City, NJ (US); Sasinda Rukshan Premarathna, New York, NY (US); Cheng Li, Jersey City, NJ (US); Bhagyasri Canumalla, Jersey City, NJ (US); Hsiao-Ching Lin, Astoria, NY (US); Yanbo Li, New York, NY (US); Davood Shamsi, New York, NY (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,704

(22) Filed: Jan. 24, 2020

(65) Prior Publication Data

US 2020/0159639 A1   May 21, 2020

Related U.S. Application Data

(63) Continuation of application No. 15/681,810, filed on Aug. 21, 2017, now Pat. No. 10,579,493.

(60) Provisional application No. 62/378,042, filed on Aug. 22, 2016.

(51) Int. Cl.
| | | |
|---|---|---|
| *G06F 11/34* | (2006.01) |
| *G06F 3/16* | (2006.01) |
| *G06Q 30/02* | (2012.01) |
| *G10L 15/22* | (2006.01) |
| *G10L 25/63* | (2013.01) |

(52) U.S. Cl.
CPC .......... *G06F 11/3438* (2013.01); *G06F 3/167* (2013.01); *G06Q 30/0201* (2013.01); *G06Q 30/0242* (2013.01); *G10L 15/22* (2013.01); *G10L 25/63* (2013.01)

(58) Field of Classification Search
CPC ......... G06F 11/3438; G06F 3/01; G06F 3/167
See application file for complete search history.

(56) References Cited

U.S. PATENT DOCUMENTS

| | | | |
|---|---|---|---|
| 5,640,319 A | 6/1997 | Beuning et al. | |
| 10,572,813 B2 * | 2/2020 | Potter | ................. G06F 3/04847 |
| 10,579,493 B2 * | 3/2020 | Benari | ..................... G06F 3/167 |

(Continued)

*Primary Examiner* — Bryan Bui
(74) *Attorney, Agent, or Firm* — Bookoff McAndrews, PLLC (57) ABSTRACT

Systems and methods are disclosed for determining an engagement level of a user interacting with an electronic program, comprising receiving or determining a decision node tree, each node in the decision node tree corresponding to a user decision point in the electronic program, determining a number of levels in the decision node tree, determining a user traversed count comprising a number of levels the user has traversed in the decision node tree, and determining the engagement level of the user with the electronic program based upon the user traversed count and the number of levels in the decision node tree.

18 Claims, 5 Drawing Sheets

(56) References Cited

U.S. PATENT DOCUMENTS

2012/0218289 A1     8/2012   Rasmussen et al.
2013/0268565 A1*   10/2013   Stergiou .............. G06F 16/9024
                                                       707/798
2017/0011294 A1*   1/2017   Jagannathan .......... G06N 5/003

\* cited by examiner

SYSTEMS AND METHODS FOR DETERMINING USER ENGAGEMENT WITH ELECTRONIC DEVICES

CROSS-REFERENCE TO RELATED APPLICATIONS

This application is a continuation of and claims the benefit of priority to U.S. application Ser. No. 15/681,810, filed Aug. 21, 2017, which claims priority under 35 U.S.C. § 119(e) to U.S. Provisional Application No. 62/378,042, filed on Aug. 22, 2016, which are incorporated herein by reference in their entirety.

TECHNICAL FIELD

Various embodiments of the present disclosure relate generally to monitoring and enabling navigation using visual and conversational devices and, more particularly, to enabling voice control of an interactive audiovisual environment, and monitoring user behavior to assess engagement.

BACKGROUND

Users enjoy an increasing number of features and capabilities in digital devices. Smart phones, for example, have embedded sensors that allow for types of user interactions, such as tracking movement and orientation, that were not previously possible.

Advertisers utilizing multiple media platforms typically seek metrics to assess the likelihood that advertising in a certain medium or to a certain user would produce a conversion, such as a click, download, installation, and/or purchase. However, present techniques do not take full advantage of some of the capabilities of digital devices.

The present disclosure is directed to overcoming one or more of these challenges.

SUMMARY OF THE DISCLOSURE

According to certain aspects of the disclosure, a method is disclosed for determining an engagement level of a user interacting with an electronic program, comprising receiving or determining a decision node tree, each node in the decision node tree corresponding to a user decision point in the electronic program; determining a number of levels in the decision node tree; determining a user traversed count comprising a number of levels the user has traversed in the decision node tree; and determining the engagement level of the user with the electronic program based upon the user traversed count and the number of levels in the decision node tree.

According to another aspect of the disclosure, a system is disclosed for determining an engagement level of a user interacting with an electronic program, comprising a data storage device storing instructions for determining an engagement level of a user interacting with an electronic program; and a processor configured to execute the instructions to perform a method comprising: receiving or determining a decision node tree, each node in the decision node tree corresponding to a user decision point in the electronic program; determining a number of levels in the decision node tree; determining a user traversed count comprising a number of levels the user has traversed in the decision node tree; and determining the engagement level of the user with the electronic program based upon the user traversed count and the number of levels in the decision node tree.

According to another aspect of the disclosure, a non-transitory computer readable medium is disclosed storing instructions that, when executed by a processor, cause the processor to perform a method of optimizing distribution of resources for data elements, the method comprising receiving or determining a decision node tree, each node in the decision node tree corresponding to a user decision point in the electronic program; determining a number of levels in the decision node tree; determining a user traversed count comprising a number of levels the user has traversed in the decision node tree; and determining the engagement level of the user with the electronic program based upon the user traversed count and the number of levels in the decision node tree.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to enabling voice control of an interactive audiovisual environment, and monitoring user behavior to assess engagement.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
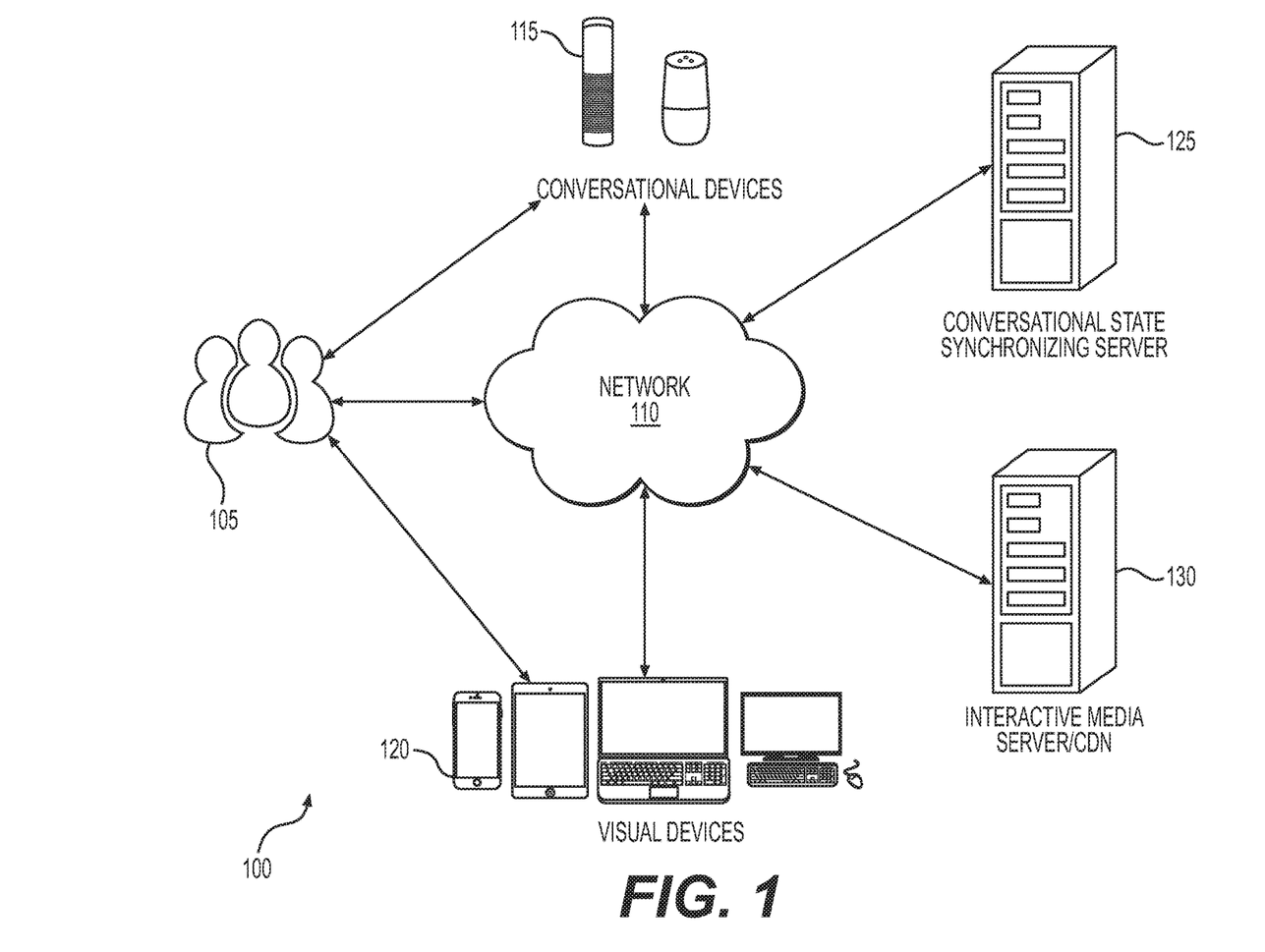
FIG. 1 depicts an exemplary system infrastructure for user interaction with conversational devices and/or other digital devices, according to exemplary embodiments of the present disclosure.

FIG. 1 depicts an exemplary system 100 for user interaction with conversational devices and/or other digital devices, according to exemplary embodiments of the present disclosure. Any suitable system infrastructure may be put into place to allow for user 105 interaction with conversational devices 115 and/or other digital devices 120, and engagement assessment. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: visual devices 120 and/or conversational devices 115, which may include Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, smart devices such as smart televisions, and the like. Conversational devices 115 may further include "smart speakers" and/or other devices with voice-interaction capabilities. The terms "computer," "server," and the like, are generally used interchangeably herein, and refer to any of the above devices and systems, as well as any data processor.

One or more users 105 may interact directly with one or more visual devices 120, or via one or more networks 110, while practicing techniques discussed herein. The user 105 may further interact directly with one or more conversational devices 115, or via one or more networks 110, while practicing techniques discussed herein. Conversational devices 115 may interact with one or more conversational state synchronizing servers ("conversation servers") 125 via network 110. Conversation servers 125 may recognize, process, and/or initiate responses to voice or other commands of the user 105. Visual devices 120 may interact with one or more interactive media servers 130. The one or more interactive media servers 130 may comprise a content delivery network. The interactive media server 130 may process and/or execute techniques discussed herein and/or may provide an electronic software program to visual devices 120 and/or conversational devices 115 that practices techniques discussed herein. While depicted as separate in FIG. 1, the functions of conversation server 125 and interactive media server 130 may be integrated on a single server or other electronic device.

As shown in FIG. 1, a user 105 may access one or more visual devices 120 and conversational devices 115 to initiate an interactive audiovisual display. The visual device may allow a user to pan and/or move around a simulated space. The conversational device may receive and interpret the user's voice, and may allow the user to control actions and displays of the visual device via voice commands received by the conversational device. In an alternative embodiment, the conversational and visual devices may be integrated into a single device.

As discussed above, the conversational device(s) may communicate with a conversational server 125. Visual device(s) 120 may communicate with one or more interactive media servers 130, which may or may not be separate from the voice interpretation server. The conversational server may communicate with the interactive media server, and vice versa, to integrate the audio and visual components of the audiovisual experience being presented to the user. A user login and/or designation may cause a conversational device to become linked with a visual device, such that an audiovisual experience may be displayed in a synchronized manner. After login, one or more servers associated with multiple devices may exchange data to maintain synchronization between one or more visual and/or conversational devices contributing to the audiovisual experience. In such a manner, young children even may be able to initiate and operate the electronic software program, for example, using voice control. One or more databases may be utilized in the system 100.

Figure 2:
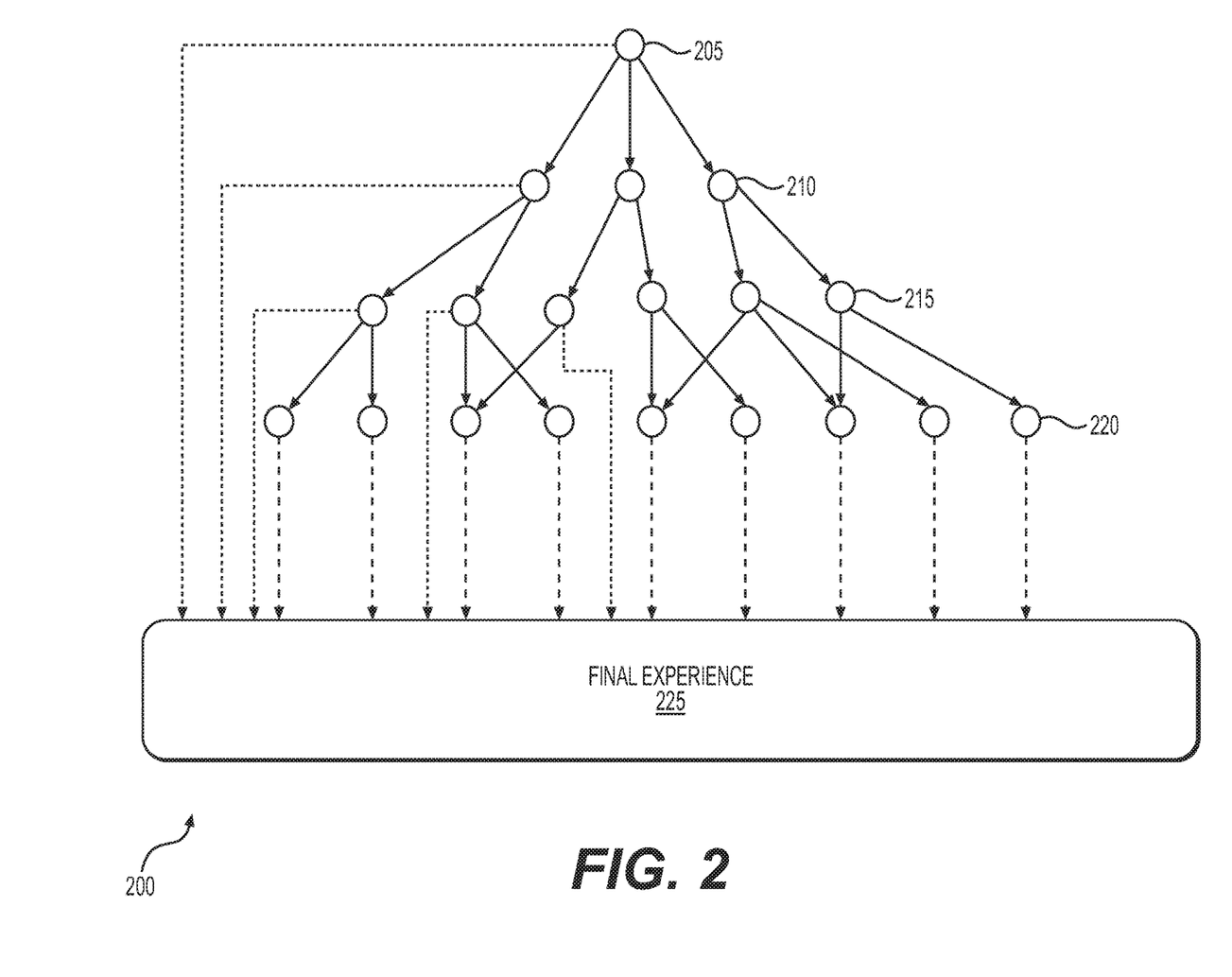
FIG. 2 depicts a decision node tree corresponding to decision points in an electronic software program, according to exemplary embodiments of the present disclosure.

FIG. 2 depicts a decision node tree 200 with nodes corresponding to decision points in an electronic software program, according to exemplary embodiments of the present disclosure. The electronic software program may comprise steps executed on one or more devices depicted in FIG. 1, and may be executed at least in part by providing electronic communications across network 110.

For example, at the initial node level 205, the user of the electronic software program may make one of three possible choices, leading to one of the three possible nodes at level 210. At level 210, the user may make one of many choices that would lead to level 215, and then level 220, and so on. The user may make selections that cause jumps to any other nodes in the decision node tree 200, including up or down node levels. The sequence of user selections collectively determine the final user experience 225.

Figure 3:
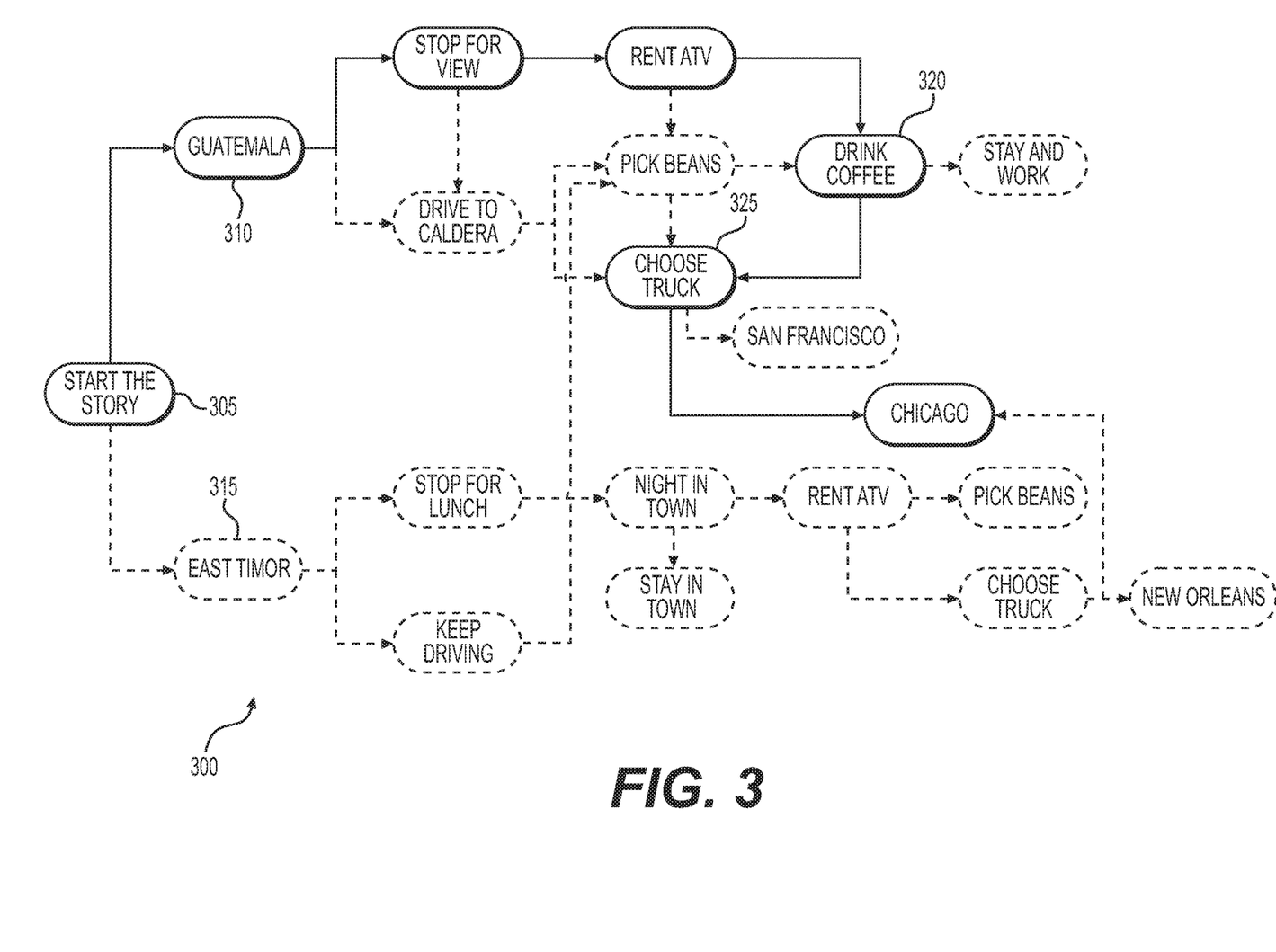
FIG. 3 depicts a decision node tree corresponding to decision points in an electronic software program, according to exemplary embodiments of the present disclosure.

FIG. 3 depicts a decision node tree 300 for an example electronic software program. The user 105 may, at step 305, select to proceed to step 310 and visit Guatemala, or select to proceed to step 315 and visit East Timor. Upon selection of Guatemala, the user may, at some point, choose between stopping for the view, or driving to the caldera, and so on. With each selection of an option, the user 105 may move to another level in the decision node tree 300 of the electronic software program. The user may jump from any node to any node in the decision node tree 300, and may move forward a level with a selection, or may move backwards a level. For example, at step 320, the user 105 may choose to go back a level to step 325 to select a truck. Further, the user may be able to select to go to the final experience from any node in the decision node tree.

One or more conversational device 115 and/or visual device 120 may coordinate to enable an audiovisual experience for the user of the electronic software program. For example, the user may verbally or otherwise indicate that she wishes to go to Guatemala, then stop to enjoy the view, then rent an all-terrain vehicle, etc. At each point in the story, the visual device may present an interactive photo and/or video which may allow the user to pan their view at will. Two-dimensional and/or three-dimensional audio and/or video imagery may be displayed. Synchronized audio may be played from the one or more conversational devices 115. The visual display may be presented in a virtual reality environment, on a laptop, tablet, cell phone, etc. The user 105 may initiate an audiovisual display or story by pressing play on a visual device 120, verbally indicating the desire to begin, etc.

In this manner, media from multiple devices may synchronize to create a rich user experience. Devices in the system 100 may also regularly exchange state information, for example via multicast. State information exchange may help retain close device synchronization. The devices in system 100 may establish one or more websocket connections with each other using a synchronization protocol. For example, the conversational devices 115 may exchange audio data with conversation server 125, interactive media server 130, and/or one or more application programming interface (API) server. The API servers may be, for example, the conversation server 125 and/or the interactive media server 130, or one or more other servers connected to the network 110. Audio content may be provided via HTTP or HTTPS, for example. Similarly, visual devices 120 may exchange data with one or more conversation servers 125, interactive media servers 130, and/or one or more application programming interface (API) servers. Data from the conversation server 125 may also be provided to, and received from, the interactive media server 130. State information may be exchanged between conversational devices 115, visual devices 120, and one or more API and other servers. The API servers, for example, may distribute state and other information to any participating devices.

While using the electronic software program, the user may discard the file progress, restart at the beginning, or resume from a previous viewing session. A percentage or other indicator of current progress may show, for example, the percent of progress through the audio, video, or through the workflow of the electronic software program. The electronic software program may comprise, for example, a choose-your-own-adventure story, a role-playing game, an augmented reality game, interactive news, interactive cooking recipes, etc. The user might not be able to start the electronic software program via the visual device 100, but might instead be required to initiate the electronic software program via voice command to one or more conversational devices 115. When finished, the electronic software program may return to a menu indicating that play is complete, and may be automatically restarted.

The user may be able to select options verbally, such as within an audiovisual display such as an interactive show or movie, interactive advertisement, game, and/or choose-your-own-adventure story, for example. Verbal options may be displayed on the screen of the visual device 120. The user may also be presented with the option to end the electronic software program, and may be required to do so verbally.

Advertisements or other promotional materials may also be displayed in the electronic software program. Users 105 may be able to pan the visual device 120 around to view different portions of the display, such as in a virtual reality environment. A variety of factors such as where the user gazes, and for how long, may be tracked to determine user engagement with the audiovisual advertisement or promotional material.

Engagement may be determined by measuring a level of user interest in at least a portion of the electronic software program. Determining engagement may comprise determining a baseline awareness or cognitive awareness of one or more brands featured in the electronic software program. This may be termed "pre-engagement." Determining cognitive awareness may include metrics measuring purchasing intent, brand awareness, product awareness and awareness changes, and ad relevance, such as with targeted advertising. Determining engagement may further include determining behavioral metrics such as a user's eye gaze within the audiovisual display, how commonly the user gazes at objects in the display, and for how long. Determining engagement may also comprise determining what a user follows, shares, likes, how often a user interacts with ads (via click, tap, swipe, play, hover), and how often the user searches for and/or purchases products in the electronic software program. Engagement may further comprise considering emotional factors such as ad relevance, relevance to content in which the user is known to be interested, and brand evangelism.

Emotional engagement may be gauged by, for example, determining a change in brand perception, brand favorability, and/or brand loyalty both before and after exposure to one or more audiovisual media displays associated with an advertiser. Physiological response may also be monitored during playback of the audiovisual display. Changes in breathing, circulation, and/or other physiological metrics may be determined and stored.

Behavioral and physical aspects of engagement may also be determined. For example, eye tracking may be used to track gaze time and gaze rate of the user(s). Gaze time may comprise the time a user looks at the audiovisual display, or looks at some predetermined portion of the audiovisual display. For example, a user may look at a product within an ad or audiovisual display, which may be tracked. The gaze rate may be determined to be the percent or proportion of a plurality of users who look at an ad or portion of an ad or audiovisual display. Gaze time and rate may be tracked with eye tracking. Analytics, voice tracking and other biometric tracking may be used to determine total user interaction with an ad or other audiovisual display, or portion thereof. Interaction rate may also be determined as a percent of user interactions out of total possible interactions. Interaction rate may also be determined as the portion of users who purposefully view an ad or portion of an ad for a predetermined period of time.

Engagement may also be determined based upon the path that a user takes through a story or other audiovisual display. Each time a user makes a choice as to how to proceed, this information may be used to determine engagement, or as part of an engagement metric. For example, in a coffee-branded electronic software program, the display may ask the user if they wish to go to Guatemala or East Timor. The user's selection may indicate to the coffee provider which types of coffee the user prefers. The information may also be used by other entities such as advertisers. For example, a travel company may choose to advertise trips to Guatemala based upon a user selection of Guatemala in the visual device 120. In a choose-your-own-adventure story, each user choice in the story may be used to determine engagement, and each choice may be used to inform content recommendations, targeted advertisements, etc.

Engagement may further be determined if a user backs up in an audiovisual display and re-performs or re-traverses an area. This may be an indication of an increased engagement with the audiovisual display overall. This may also be an indication of decreased engagement with the originally selected path. Engagement may further be determined if a user replays the audiovisual display, which may be a sign of increased engagement. For example, if a user replays a coffee audiovisual display, and selects to go to Guatemala twice, it may be taken to be a sign that engagement is higher both for coffee generally and for Guatemala. If a user replays the electronic software program and goes to East Timor instead, it may be taken to mean that engagement is higher for coffee, though the engagement for Guatemala may stay the same or decrease slightly. A metric of engagement based upon a user's path through the audiovisual display may be referred to as a path metric.

A user's engagement may also be determined by determining the user's depth in the electronic node tree, as the longer a user uses the electronic software program, the more engaged a user is likely to be. Engagement may also be determined based on a ratio of the current node depth to the total node depth of the electronic node tree.

Other factors may be considered, such as whether the user has made choices while traversing the decision node tree 200, or merely used the default selections. A ratio of choices relative to defaults may also be factored. Further, engagement metrics may be increased if a user reaches the end of the decision node tree.

Any combination of engagement metrics discussed herein may be used in combination to determine a total user engagement metric. Engagement metrics may be assigned varying weights and used together to form a composite engagement score. Metrics may also be averaged to determine a total engagement metric. For example, the ratio of the current decision node tree depth relative to the total decision node tree depth, a metric indicating whether the user has made any non-default choices, and a metric indicating that the user reached the end of the decision node tree may be summed and averaged to determine a total user engagement metric as a number between 0 and 1.

As path metrics of users may be stored, at each node in the decision node tree 200, the electronic software program may recommend a choice to the user 105 based upon, for example, the user's selection and/or engagement history and/or other users selection and/or engagement histories. Such recommendations may factor a user's favorite location, a user's favorite ending (for example, happy or sad endings), a user's valuing of image quality, etc. The recommendations may depend on the time of day. For example, a user may prefer sad endings at night, but happy endings in the mornings. The recommendations may further be determined based on matching the current user to similar user path metrics and/or engagement histories.

The electronic software program may automatically remove nodes from the decision node tree 200 that result in engagement metrics below a predetermined threshold. For example, if a node comprises a video, and the average watch time of the video of users who reach the node is below a predetermined threshold, the video may be automatically removed and/or replaced with other content.

The electronic software program may further automatically learn paths through the decision node tree 200 that result in reduced user engagement. For example, if a decision node tree has 25 possible paths, but four yield average user engagement metrics below a threshold, or if the paths are not selected a predetermined portion of the time, the four paths may be removed from the decision node tree. When "good" and "bad" paths cross at a common node, the common node may be allowed to remain in the decision node tree, and the "bad" path may only be partially removed.

Figure 4:
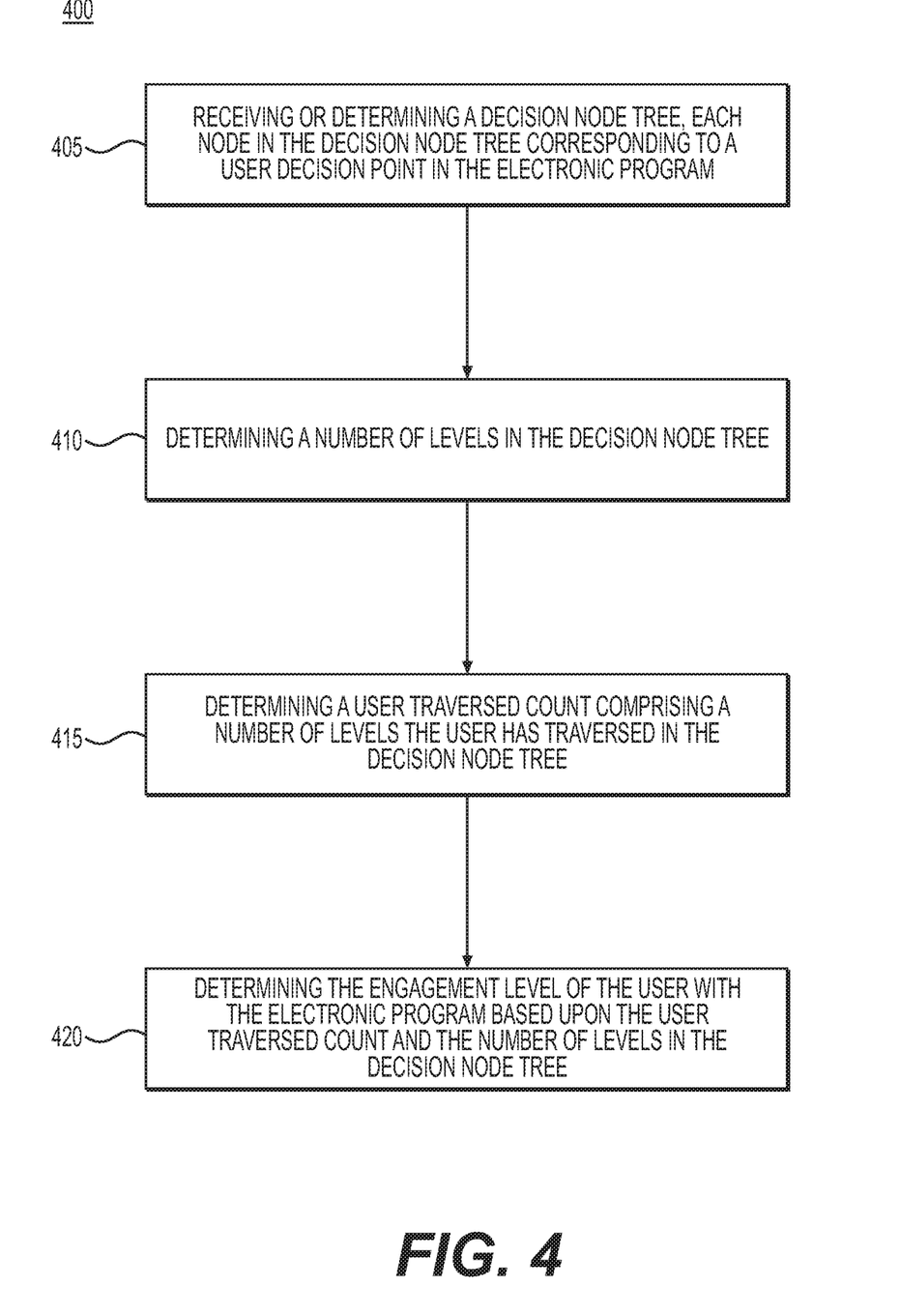
FIG. 4 depicts an exemplary method for determining an engagement level of a user interacting with an electronic program, according to exemplary embodiments of the present disclosure.

FIG. 4 depicts an exemplary method for determining an engagement level of a user interacting with an electronic program, according to exemplary embodiments of the present disclosure. At step 405, a decision node tree 200 may be received or determined, each node in the decision node tree corresponding to a user decision point in the electronic program. At step 410, a number of levels in the decision node tree may be determined. At step 415, a user traversed count may be determined comprising a number of levels the user has traversed in the decision node tree. At step 415 an engagement level of the user with the electronic program may be determined based upon the user traversed count and the number of levels in the decision node tree.

Figure 5:
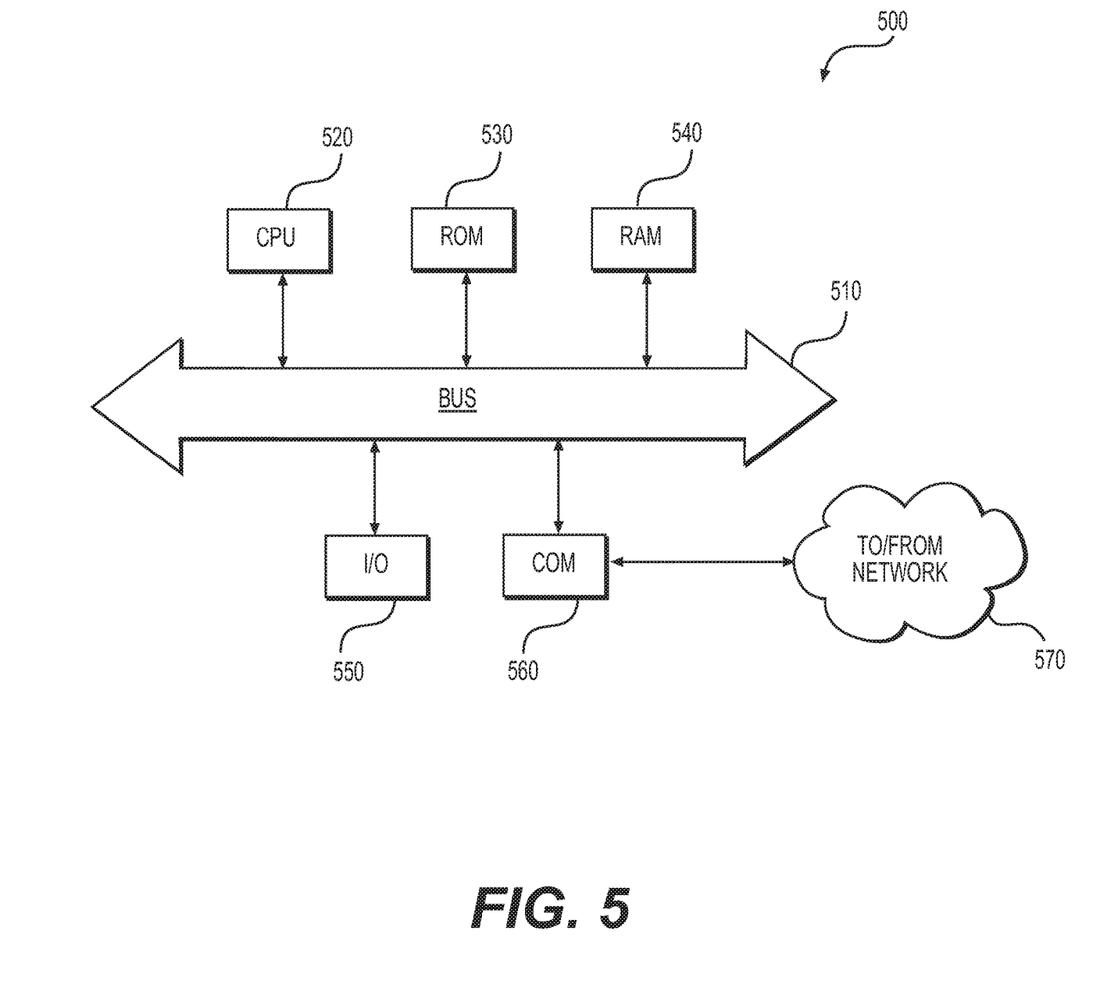
FIG. 5 depicts an exemplary system for determining an engagement level of a user, according to exemplary embodiments of the present disclosure.

FIG. 5 depicts an exemplary system 500 for determining an engagement level of a user, according to exemplary embodiments of the present disclosure. The system 500 may correspond to any of, or a combination of, the example devices of FIG. 1, such as the conversation server 125 and/or the interactive media server 130. It is believed that those skilled in the art are familiar with the structure, programming and general operation of such computer equipment and as a result the drawings should be self-explanatory.

A platform for a server or the like 500, for example, may include a data communication interface for packet data communication 560. The platform may also include a central processing unit (CPU) 520, in the form of one or more processors, for executing program instructions. The platform typically includes an internal communication bus 510, program storage and data storage for various data files to be processed and/or communicated by the platform such as ROM 530 and RAM 540, although the server 500 often receives programming and data via network communications 570. The hardware elements, operating systems and programming languages of such equipment are conventional in nature, and it is presumed that those skilled in the art are adequately familiar therewith. The server 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the electronic software program may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for determining an engagement level of a user interacting with an electronic software program, one or more processors being configured to execute the electronic software program to perform the method comprising:
   receiving, at one or more processors, a decision node tree, each node in the decision node tree corresponding to a user decision point in the electronic software program;
   determining, at the one or more processors, a number of levels in the decision node tree;
   determining, at the one or more processors, a user traversed count comprising a number of levels the user has traversed in the decision node tree;
   determining, at the one or more processors, the engagement level of the user with the electronic software program based upon the user traversed count and the number of levels in the decision node tree;
   tracking, at the one or more processors, a frequency of each of one or more user paths through the decision node tree by one or more users; and
   recommending, at the one or more processors, a user path from the one or more user paths to the user based on the frequency of each of the one or more user paths through the electronic software program.

2. The method of claim 1, wherein the engagement level of the user is further determined based upon a ratio of the user traversed count to the number of levels in the decision node tree.

3. The method of claim 1, wherein determining the engagement level of the user further comprises:
   determining a score corresponding to a number of choices the user has made in the electronic software program; and
   determining the engagement level of the user based on the score corresponding to the number of choices the user has made, the user traversed count, and the number of levels in the decision node tree.

4. The method of claim 1, wherein determining the engagement level of the user further comprises:
   determining a score corresponding to whether the user reached the end of the decision node tree; and
   determining the engagement level of the user based on the score corresponding to whether the user reached the end of the decision node tree, the user traversed count, and the number of levels in the decision node tree.

5. The method of claim 1, wherein determining the engagement level of the user further comprises:
   determining a ratio of the user traversed count to the number of levels in the decision node tree;
   determining a score corresponding to a number of choices the user has made in the electronic program;
   determining a score corresponding to whether the user reached the end of the decision node tree; and
   determining the engagement level of the user based on the score corresponding to an average of the score corresponding to the number of choices the user has made in the electronic software program, the score corresponding to whether the user reached the end of the decision node tree, and the ratio of the user traversed count to the number of levels in the decision node tree.

6. The method of claim 1, further comprising:
   tracking one or more user paths taken by the user through the electronic software program; and
   recommending a user path to the user based upon the one or more user paths taken by the user.

7. The method of claim 1, further comprising:
   tracking one or more user paths taken through the decision node tree by one or more users of the electronic software program;
   determining a node in the decision node tree and/or path of the one or more user paths of the decision node tree associated with a predetermined level of user disengagement; and
   removing the node in the decision tree and/or path of the one or more user paths associated with the predetermined level of user disengagement.

8. A system for determining an engagement level of a user interacting with an electronic software program, comprising:
   a data storage device storing instructions for determining an engagement level of a user interacting with an electronic software program; and
   one or more processors configured to execute the instructions to perform a method comprising:
      receiving, at the one or more processors, a decision node tree, each node in the decision node tree corresponding to a user decision point in the electronic software program;
      determining, at the one or more processors, a number of levels in the decision node tree;
      determining, at the one or more processors, a user traversed count comprising a number of levels the user has traversed in the decision node tree;
      determining, at the one or more processors, the engagement level of the user with the electronic software program based upon the user traversed count and the number of levels in the decision node tree;
      tracking, at the one or more processors, a frequency of each of one or more user paths through the decision node tree by one or more users; and
      recommending, at the one or more processors, a user path from the one or more user paths to the user based on the frequency of each of the one or more user paths through the electronic software program.

9. The system of claim 8, wherein the engagement level of the user is further determined based upon a ratio of the user traversed count to the number of levels in the decision node tree.

10. The system of claim 8, wherein determining the engagement level of the user further comprises:
   determining a score corresponding to a number of choices the user has made in the electronic software program; and
   determining the engagement level of the user based on the score corresponding to the number of choices the user has made, the user traversed count, and the number of levels in the decision node tree.

11. The system of claim 8, wherein determining the engagement level of the user further comprises:

determining a score corresponding to whether the user reached the end of the decision node tree; and determining the engagement level of the user based on the score corresponding to whether the user reached the end of the decision node tree, the user traversed count, and the number of levels in the decision node tree.

12. The system of claim 8, wherein determining the engagement level of the user further comprises:

determining a ratio of the user traversed count to the number of levels in the decision node tree;

determining a score corresponding to a number of choices the user has made in the electronic software program;

determining a score corresponding to whether the user reached the end of the decision node tree; and determining the engagement level of the user based on the score corresponding to an average of the score corresponding to the number of choices the user has made in the electronic software program, the score corresponding to whether the user reached the end of the decision node tree, and the ratio of the user traversed count to the number of levels in the decision node tree.

13. The system of claim 8, the instructions performing the method further comprising:

tracking one or more user paths taken by the user through the electronic software program; and recommending a user path to the user based upon the one or more user paths taken by the user.

14. The system of claim 8, the instructions performing the method further comprising:

tracking one or more user paths taken through the decision node tree by one or more users of the electronic software program;

determining a node in the decision node tree and/or path of the one or more user paths of the decision node tree associated with a predetermined level of user disengagement; and removing the node in the decision tree and/or path of the one or more user paths associated with the predetermined level of user disengagement.

15. A non-transitory computer readable medium storing instructions that, when executed by a processor, cause the processor to perform a method of optimizing distribution of resources for data elements, the method comprising:

receiving, at one or more processors, a decision node tree, each node in the decision node tree corresponding to a user decision point in the electronic software program;

determining, at the one or more processors, a number of levels in the decision node tree;

determining, at the one or more processors, a user traversed count comprising a number of levels the user has traversed in the decision node tree;

determining, at the one or more processors, the engagement level of the user with the electronic software program based upon the user traversed count and the number of levels in the decision node tree;

tracking, at the one or more processors, a frequency of each of one or more user paths through the decision node tree by one or more users; and recommending, at the one or more processors, a user path from the one or more user paths to the user based on the frequency of each of the one or more user paths through the electronic software program.

16. The non-transitory computer readable medium of claim 15, wherein the engagement level of the user is further determined based upon a ratio of the user traversed count to the number of levels in the decision node tree.

17. The non-transitory computer readable medium of claim 15, wherein determining the engagement level of the user further comprises:

determining a ratio of the user traversed count to the number of levels in the decision node tree;

determining a score corresponding to a number of choices the user has made in the electronic software program;

determining a score corresponding to whether the user reached the end of the decision node tree; and determining the engagement level of the user based on the score corresponding to an average of the score corresponding to the number of choices the user has made in the electronic software program, the score corresponding to whether the user reached the end of the decision node tree, and the ratio of the user traversed count to the number of levels in the decision node tree.

18. The non-transitory computer readable medium of claim 15, the method further comprising:

tracking one or more user paths taken through the decision node tree by one or more users of the electronic software program;

determining a node in the decision node tree and/or path of the one or more user paths of the decision node tree associated with a predetermined level of user disengagement; and removing the node in the decision tree and/or path of the one or more user paths associated with the predetermined level of user disengagement.

* * * * *